United States Patent [19]

Vollmer et al.

[11] Patent Number: 4,805,681
[45] Date of Patent: Feb. 21, 1989

[54] CONTROL VALVE FOR INFLUENCING THE TIRE PRESSURE OF A VEHICLE WHEEL

[75] Inventors: Karl Vollmer, Gernsbach; Klaus Keilpflug, Malsch, both of Fed. Rep. of Germany

[73] Assignee: Daimler-Benz Aktiengesellschaft, Stuttgart, Fed. Rep. of Germany

[21] Appl. No.: 56,706

[22] Filed: Jun. 2, 1987

[30] Foreign Application Priority Data

Jun. 4, 1986 [DE] Fed. Rep. of Germany ....... 3618827

[51] Int. Cl.$^4$ ............................................ B60C 23/00
[52] U.S. Cl. ................................... 152/417; 137/224; 152/416; 251/25; 251/63.4; 301/124 R
[58] Field of Search .................. 152/415–417; 137/224, 225; 301/6 WB, 124 R; 251/63.4, 63.5, 25

[56] References Cited

U.S. PATENT DOCUMENTS

| | | | |
|---|---|---|---|
| 4,685,501 | 8/1987 | Williams | 152/417 |
| 4,700,763 | 10/1987 | Williams | 152/417 |

FOREIGN PATENT DOCUMENTS 1907082  2/1969  Fed. Rep. of Germany .
2544555  4/1977  Fed. Rep. of Germany .
3127646  4/1983  Fed. Rep. of Germany .

Primary Examiner—Michael W. Ball
Assistant Examiner—Thomas Bokan
Attorney, Agent, or Firm—Barnes & Thornburg

[57] ABSTRACT

A control valve for increasing or reducing the air pressure in a tire of a vehicle wheel that is to be carried out over a short period of time, has a valve chamber that is connected, on one side, to the interior of the tire and, on the other side, to a supply duct. The valve chamber has a space that extends axially through the wheel hub, the interior end of this space being sealed off with respect to an axle part carrying the vehicle wheel. In this space, an automatically closing valve member is arranged that can be controlled into its open position against the interior pressure of the tire by a control piston that is also guided in this space and can be acted upon by a pressure medium. For supplying air to and removing air from the tire, the axle part projects into an axial duct of the control piston with a cylindrical projection that is penetrated by the supply duct. For the opening of the control valve for the removal of air and, if necessary, also for supplying air to the tire, the pressure medium is supplied via a supply duct provided in the axle part and leading out into an intermediate space located between the axle part and the control piston.

5 Claims, 1 Drawing Sheet

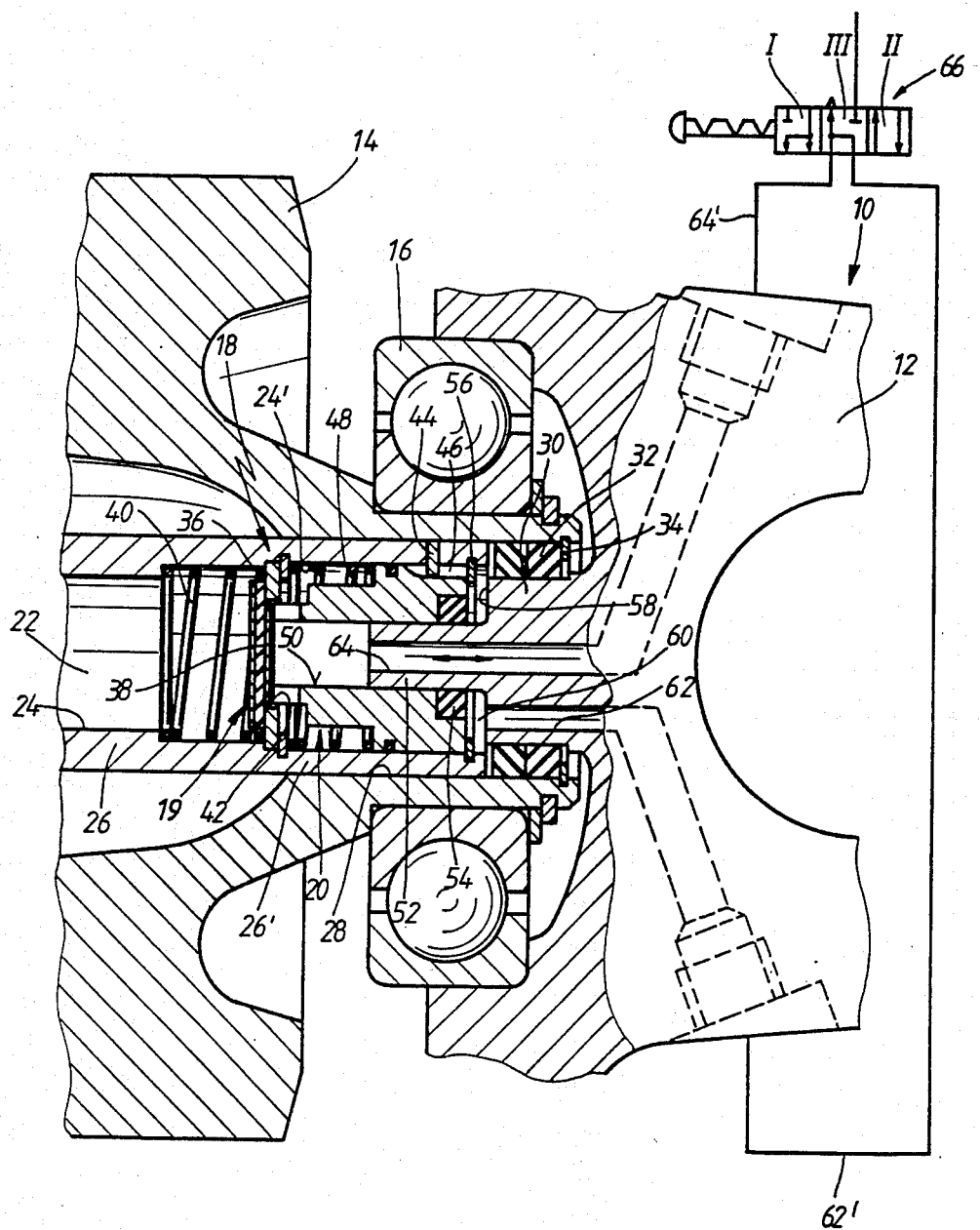

CONTROL VALVE FOR INFLUENCING THE TIRE PRESSURE OF A VEHICLE WHEEL

BACKGROUND AND SUMMARY OF THE INVENTION

The present invention relates to a control valve for influencing the tire pressure of a vehicle wheel having a valve chamber that on one end is connected to the interior of a tire of the wheel and on the other end is connected to a supply duct and a control duct. The valve chamber has a penetrating space that axially penetrates a wheel hub and is sealed off with respect to an axle part carrying the vehicle wheel. The control valve has an automatically closing valve means, and a control piston means acted upon by a pressure medium via the control duct for directing the automatically closing valve means into an open position against the interior pressure of the tire. The supply duct and the control duct extend through the axle part and air is suppliable to and removable from the supply duct via a supply control valve. The control duct is connectable with a fluid pressure medium source at least while air is simultaneously removed from the supply duct.

A control valve of this general type is known from German Published Unexamined Patent Application No. 25 44 555 (FIG. 2). It forms the conventional supply valve located on the outside at the vehicle wheel, in the chamber of which, coaxially to the automatically closing valve member, the control piston is guided that is used for the control of the supply valve. The supply duct is connected at the valve chamber coaxially to the control piston. The control piston is penetrated by an axial duct. In order to increase the tire pressure, compressed air is admitted to the control piston, whereby it directs the valve member into its open position. At the same time, compressed air, through the axial duct of the control piston, flows into the tire.

In order to reduce the pressure, compressed air is also admitted to the control piston for the opening of the control valve. However, in this circumstance, air is supplied to the control valve that has a pressure that is sufficient for producing the piston force required for opening the valve, but also permits a flowing-off of the air that is under a higher pressure from the vehicle tire. Because of the air that is present in the supply duct at a relatively low pressure, the removal of air from the tire, in this case, takes place correspondingly slowly, the small cross-section of the valve opening also contributing to the slow removal of air.

In addition to the construction according to German Published Unexamined Patent Application No. 25 44 555, an arrangement is known from German Published Unexamined Patent Application No. 31 27 646 for supplying and removing tire air, which has a space that axially penetrates the wheel hub and a countershaft output gear wheel fastened on its rear side. The interior end of this space is sealed off with respect to an axle part carrying the vehicle wheel. A hollow-cylinder-shaped projection of the axle part projects into this space, this projection forming a connecting nipple to an air duct provided in the axle part. In that construction, no automatically closing valve is provided at the vehicle wheel or in the addressed space, but the tire pressure is maintained via an air source provided outside the vehicle wheel and a valve.

The present invention has the objective of providing a control valve for influencing the tire pressure of a vehicle wheel that permits a supplying and removing of tire air that can be carried out in a short period of time, and distinguishes itself by its secure arrangement with respect to output influences and easy connection.

This and other objects are achieved by the present invention by providing a control valve for influencing the tire pressure of a vehicle wheel which has a control piston means that is penetrated by an axial duct, and the axle part has a nonbearing cylindrical projection that is penetrated by the supply duct, this cylindrical projection projecting into the axial duct. The axle part and the control piston define an annular intermediate space therebetween, the control duct leading out into this annular intermediate space.

The valve member and the control piston of the control valve according to the present invention are located within a vehicle wheel in the area of the axle part that carries it. For supplying and removing tire air as well as for the adjusting of the control piston for the opening of the control valve, separate ducts are provided for which the arrangement of special lines is not necessary. The passage cross-section of the valve opening is therefore able to be several times larger than a conventional tire filling valve, and for the removal of air, the supply duct is connected directly with the atmosphere.

Other objects, advantages and novel features of the present invention will become apparent from the following detailed description of the invention when considered in conjunction with the accompanying drawings.

BRIEF DESCRIPTION OF THE DRAWING

The drawing is a partial longitudinal section through a vehicle wheel bearing of a driven portal axle constructed in accordance with a preferred embodiment of the present invention.

DETAILED DESCRIPTION OF THE DRAWING

At a driven portal axle 10, a countershaft output gear wheel 14 that is fastened at the rear side of a wheel hub of a steered vehicle wheel that is not shown, is disposed at the steering knuckle 12 by means of a roller bearing 16. For an unsteered vehicle wheel, the steering knuckle 12 is replaced by an axle casing flange in certain preferred embodiments.

A control valve with a general reference number 18 is used for increasing or reducing the air pressure in the wheel tire. This control valve 18, among other things, has a closing device 19 which closes automatically, as well as a control piston 20. These components of the control valve 18 are arranged behind one another in a penetrating space 22 that axially penetrates the wheel hub and the countershaft output gear wheel 14. The penetrating space 22 is formed by the interior duct 24 of a sleeve 26 provided coaxially to the wheel axle. The sleeve 26, with its end piece that, according to the drawing is on the left or on the outside, is held in the wheel hub (not shown). Also, the sleeve 26, with its sleeve end piece 26' that is on the right and on the inside in the drawing, is held in a hub bore 28 of the countershaft output gear wheel 14, in a torsionally fixed and sealed-off manner.

Into the sleeve end piece that is not shown, a connecting nipple is screwed from which an air duct is led away that is connected with the interior of the wheel tire. The sleeve end piece 26' ends inside the hub bore 28 into which a cylindrical projection 30 for the steering knuckle 12 projects that is coaxial to the hub bore 28, the outside diameter of this projection 30 being smaller than the inside diameter of the hub bore 28. A ring seal 32 that is inserted into the hub bore 28, rests in a sealing way against the outer circumference of the cylindrical projection 30 and thereby also seals off tightly to the outside the penetrating space 22 in the area of the right sleeve end piece 26'. An inner retaining ring 34 holds the ring seal 32 in the hub bore 28.

The closing arrangement 19 has, for example, a ring-shaped valve seat 36 as well as a disk-shaped valve member 38, that, by means of a pressure spring 40, is pressed against the valve seat 36. This is therefore an automatically closing device that also opens automatically as soon as compressed air is admitted to it for an increase of the interior pressure of the tire, and thereby exposes the passage opening 42 which has a large diameter.

Between the closing arrangement 19 and the cylindrical projection 30 of the steering knuckle 12, the control piston 20 is located that, in a sealed-off manner, can be slid in a cylindrical section 24' of the inside duct 24 of the sleeve, and is torsionally fixed. For this purpose, a pin-shaped driving means 44 projects at the inner circumference of the cylindrical section 24' of the interior duct 24 of the sleeve and engages into an exterior longitudinal groove 46 of the control piston 20. The control piston 20 is adjustable in the direction of the valve member 38 against the force of a restoring spring 48 and is able to reach through the passage opening 42 with its end piece (on the left according to the drawing), in order to be able to lift the valve member 38 off the valve seat 36.

The control piston 20 is penetrated by an axial duct 50 into which the cylindrical projection 30 of the steering knuckle 12, sealed off by a ring seal means 54, projects by means of a cylindrical end piece 52 that is correspondingly reduced in its cross-section. The control piston 20 can therefore be slid axially on the cylindrical end piece 52. The starting position of the control piston 20 is shown in the drawing and releasing the valve member 38 is defined by a stop ring 56 that is inserted into the cylindrical section 24' of the inside duct 24 of the sleeve.

In this starting position, an intermediate space 60 is located between the control piston 20 and the front surface 58 of the cylindrical projection 30. A control duct 62, preferably an air supply duct, leads out into the intermediate space 60, this duct 62 being provided in the steering knuckle 12 and emerging at the front surface 58 of the cylindrical projection 30.

The cylindrical projection 30, including its end piece 52, is penetrated axially by a supply duct 64 that is provided in the steering knuckle 12. Both ducts 62 and 64, via one line 62' and 64' respectively, are connected with a control valve 66, by which the interior pressure of the tire can be regulated.

For increasing the interior pressure of the tire, it may, in certain embodiments, be sufficient to connect only the supply duct 64 with the compressed-air source if the air pressure is sufficiently high in order to direct the valve member 38 into its open position.

However, in preferred embodiments, for increasing the interior pressure of the tire, compressed air is supplied via the control valve 66 and the lines 62' and 64', to the control duct 62 as well as to the supply duct 64. For this purpose, the control valve 66 must be directed into control position I. In this case, compressed air flows into intermediate space 60, whereby the valve member 38 is directed into its open position by the control piston 20 and compressed air is supplied to the tire via the supply duct 64.

For the reduction of the interior pressure of the tire, the control valve 66 must be directed into its control position II. In this case, compressed air is supplied to the intermediate space 60 via the line 62' and the control duct 62, for the opening of the closing arrangement 19. The air that flows out of the opened closing arrangement 19, in this case, can flow off into the atmosphere via the supply duct 64, the line 64' and the control valve 66. When a desired pressure reduction is achieved, the supply of compressed air into the intermediate space 60 can be terminated by adjusting the control valve 66 into its control position III. In this case however, the connection of the supply duct 64 and the line 64' with the atmosphere continues to be maintained and as a result, the closing arrangement 19 can be closed again and thus a desired changed interior tire pressure can be maintained.

In the preferred embodiments, the parts controlling the flow of air are housed so that they are protected from the outside. Also, air supply lines at the wheel that must be especially embedded are not required. Lastly, the relatively large cross-section of the passage opening 42 permits a short-term increase or decrease of the interior pressure of the tire.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed:

1. A control valve for influencing the tire pressure of a vehicle wheel, having a valve chamber that on one end, is connected to an interior of a tire of said wheel and, on another end, is connected to a supply duct and a control duct, said valve chamber having a penetrating space that axially penetrates a wheel hub and is sealed off with respect to an axle part carrying the vehicle wheel, said control valve having automatically closing valve means, and control piston means acted upon by a pressure medium via said control duct for directing said automatically closing valve means into an open position against the interior pressure of the tire, said supply duct and said control duct extending through said axle part, and air being suppliable to and removable from said supply duct independently of said control duct via a supply control valve, and wherein said closing means is capable of being opened by pressurized air in said supply duct and said control duct being connectable with a fluid pressure medium source at least while air is removed simultaneously from said supply duct, wherein said control piston means is penetrated by an axial duct, and said axle part has a nonbearing cylindrical projecting that is penetrated by said supply duct, said cylindrical projection projecting into said axial duct, and wherein said axle part and said control piston means define an annular intermediate space therebetween into which said control duct leads out.

2. A control valve according to claim 1, wherein said penetrating space is inside a sleeve that is arranged in a torsionally fixed manner in said wheel hub, and wherein said control piston means is guided in said sleeve such that said control piston means is non-rotatable and axially slidable.

3. A control valve according to claim 2, wherein said sleeve has an inner end which projects into a cylindrical hub recess that is coaxial to a wheel axle, said hub recess having an interior sealing means that in a sealing manner rests against said cylindrical projection, said projection having a cylindrical end piece that has a reduced diameter which projects into said control piston means.

4. A control valve arrangement for influencing the tire pressure of a vehicle wheel carried on an axle part, comprising:
supply duct means for fluidly communicating air to and from said tire;
automatically closing valve means connected between said supply duct means and said tire for selectively allowing and preventing fluid communication between said tire and said supply duct means; and wherein said closing valve means is capable of being opened by pressurized air in said supply duct;
control duct means for providing a fluid control pressure for controlling said closing valve means wherein said control duct means and said control pressure is independent of said supply duct means; and
control piston means for controlling said closing valve means in response to said control pressure, wherein said control duct means opens into a space between said control piston means and an axle part wherein said axle part has a projection, and said control piston means has an axial duct for receiving said projection.

5. A control valve according to claim 4, wherein said supply duct means extends through said axle part and said projection into said axial duct.

* * * * *